United States Patent
Kievman (10) Patent No.: US 8,563,030 B1
(45) Date of Patent: Oct. 22, 2013

(54) SINGULTUS-STOPPING ARTICLE AND COMPOSITION

(76) Inventor: Mallory Kievman, Manchester, CT (US)

(*) Notice: Subject to any disclaimer, the term of this patent is extended or adjusted under 35 U.S.C. 154(b) by 2830 days.

(21) Appl. No.: 13/590,560

(22) Filed: Aug. 21, 2012

Related U.S. Application Data (60) Provisional application No. 61/526,053, filed on Aug. 22, 2011.

(51) Int. Cl.
*A61K 9/68* (2006.01)

(52) U.S. Cl.
USPC .......................................................... 424/440

(58) Field of Classification Search
None
See application file for complete search history.

(56) References Cited

U.S. PATENT DOCUMENTS

| | | | | |
|---|---|---|---|---|
| 4,692,339 | A * | 9/1987 | Stetson et al. | 426/72 |
| 4,753,816 | A * | 6/1988 | Vink et al. | 426/660 |
| 5,002,970 | A * | 3/1991 | Eby, III | 514/494 |
| 5,476,678 | A * | 12/1995 | Walter et al. | 426/660 |
| 5,554,410 | A * | 9/1996 | Bell et al. | 426/660 |
| 5,762,963 | A | 6/1998 | Byas-Smith | |
| 5,827,527 | A * | 10/1998 | Leonard | 424/440 |
| 6,416,800 | B1 | 7/2002 | Weber et al. | |
| 7,037,519 | B1 | 5/2006 | Humphrey | |
| 2003/0012819 | A1* | 1/2003 | Ko et al. | 424/493 |
| 2003/0215501 | A1* | 11/2003 | Myatt et al. | 424/465 |
| 2005/0019417 | A1* | 1/2005 | Ko et al. | 424/490 |
| 2005/0152932 | A1* | 7/2005 | Normand et al. | 424/401 |
| 2007/0087053 | A1* | 4/2007 | Hayward | 424/466 |
| 2008/0199564 | A1* | 8/2008 | Boghani et al. | 426/3 |
| 2009/0004248 | A1* | 1/2009 | Bunick et al. | 424/440 |
| 2009/0311385 | A1* | 12/2009 | DuFaux | 426/87 |
| 2011/0195170 | A1* | 8/2011 | Shigemura et al. | 426/548 |
| 2011/0237525 | A1* | 9/2011 | Haley et al. | 514/21.9 |
| 2012/0277138 | A1* | 11/2012 | Holzhauer et al. | 510/296 |
| 2013/0108605 | A1* | 5/2013 | Haley et al. | 424/94.1 |

FOREIGN PATENT DOCUMENTS

| | | | |
|---|---|---|---|
| EP | 0681786 A1 * | 5/1995 | |
| JP | 61043958 A | 3/1986 | |
| JP | 3058751 A | 3/1991 | |
| JP | 2003102428 A | 4/2003 | |
| JP | 2005132814 A | 5/2005 | |
| JP | 2008017813 A | 1/2008 | |
| WO | WO 2009139512 A1 * | 11/2009 | |

OTHER PUBLICATIONS

Elizabeth Labau, Salted Caramel Lollipops, About.com, 2010.
Kelly Sundstrom, How to Make Balloon Lollipops, ehow.com, Sep. 29, 2010.

* cited by examiner

*Primary Examiner* — Robert A Wax
*Assistant Examiner* — Olga V Tcherkasskaya
(74) *Attorney, Agent, or Firm* — McCormick, Paulding & Huber LLP (57) ABSTRACT

A singultus-arresting candy article includes a lozenge positionable to stimulate a user's phrenic nerve by sucking and by flavoring. The lozenge is flavored with effective amounts of sugar and of acid.

13 Claims, 8 Drawing Sheets

| Age | Gender | Did it Work? | Reason (if No) | Documented |
|---|---|---|---|---|
| 11 | F | Yes | – | 12/23/10 7:11 PM |
| 5 | F | Yes | – | 12/24/10 3:45 PM |
| 9 | M | | Not Enough Vinegar | 12/26/10 9:10 PM |
| 12 | F | Yes | – | 12/27/10 12:13 PM |
| 14 | M | Yes | – | 12/27/10 4:16 PM |
| 12 | F | Yes | – | 12/29/10 5:12 PM |
| 18 | F | Yes | – | 12/30/10 4:19 PM |
| 8 | F | Yes | – | 12/30/10 7:11 PM |
| 13 | M | Yes | – | 12/31/10 9:07 PM |
| 10 | M | Yes | – | 1/20/11 12:52 PM |

SINGULTUS-STOPPING ARTICLE AND COMPOSITION

CROSS REFERENCE TO RELATED APPLICATIONS

The present application is a non-provisional application claiming benefit under 35 USC §119(e) of U.S. App. 61/526,053, hereby incorporated by reference in its entirety.

BACKGROUND

1. Technical Field

The present invention relates to candies and, more particularly, to candies delivering physical stimulus.

2. Discussion of Art

Singultus is a spontaneous reflexive motion of the diaphragm that produces the malady known as hiccups. Although hiccups are associated with excessive laughter, the malady in itself is no laughing matter. Indeed, singultus is derived from the Latin word for "sobbing", which closely describes the diaphragmatic motion during hiccups.

The diaphragm in humans is a sheet-like internal muscle disposed horizontally between the lungs and the digestive organs. The diaphragm is the key muscle that changes the volume of the human thoracic cavity, causing the lungs to alternately draw in and expel air. Additionally, the diaphragm is penetrated by the esophagus, by major blood vessels, and by several nerves associated with the digestive and genitourinary organs.

Singultus disrupts normal rhythmic motion of the diaphragm, thereby interfering with breathing; digestion; and blood flow. In a brief episode, singultus is uncomfortable and inconvenient. Prolonged or chronic singultus can make life miserable.

Numerous folklore cures are known for singultus. Among more than two hundred possible remedies, some include swallowing pickle juice or other acidic liquids; startling with the help of another person; swallowing crystal sugar; drinking a glass of water or other liquid in various strange postures; and sucking one's thumb. Each of these remedies can sometimes be successful, for some people. Many of these remedies are inconvenient, or unpalatable either physiologically or culturally. For example, pickle juice, sugar, or vinegar are not readily available except in a kitchen. In particular, these liquids cannot be obtained in case hiccups come on in a crowded public place. Similarly, thumb-sucking is not a publicly acceptable behavior above the age of about four.

Additionally, it is believed that none of these remedies individually is entirely reliable. In particular, chronic or intractable hiccups lack any known reliable low-cost remedy. Therefore, some sufferers have been driven to seek drastic and expensive fixes such as surgical severing of the phrenic nerve that controls the motion of the diaphragm. This "cure" causes complete paralysis of one half the diaphragm, which results in permanent difficulty breathing.

Thus a need exists for a broadly reliable and publicly employable means for curing singultus.

SUMMARY

In embodiments, a singultus-arresting candy composition is formed by a process including forming a first mixture of granulated sugar and water; heating the first mixture to a hard crack temperature; forming a syrup by mixing with the first mixture a second mixture including acetic acid; and cooling the syrup to room temperature. In certain embodiments, the first mixture also includes isomalt. In certain embodiments, the second mixture also includes maltodextrin.

In embodiments, a singultus-arresting candy article includes a lozenge positionable to stimulate a user's phrenic nerve by sucking and by flavoring. The lozenge is flavored with effective amounts of sugar and of acid.

Embodiments and aspects of the invention will be better understood, with reference to a detailed description of the appended drawings that show exemplary embodiments of the invention.

DESCRIPTION OF EMBODIMENTS

Figure 1:
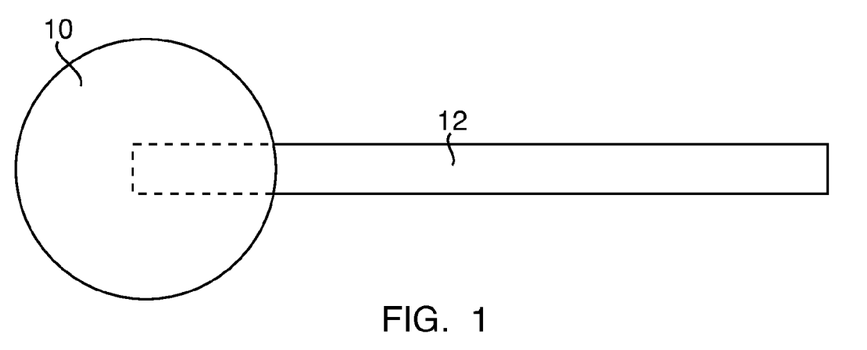
FIG. 1 shows in schematic view a singultus-mitigating article including a lollipop candy of singultus-seizing shape and composition, according to an embodiment of the present invention.

Referring to FIG. 1, an article according to an embodiment of the present invention includes a candy article 10 formed on a stick 12.

The candy article 10 is formed in a suckable shape, with a composition combining (i) sugar; and (ii) vinegar, preferably apple cider vinegar.

In use, a person suffering from hiccups inserts the lollipop candy into their mouth and sucks. It has been discovered that the sucking action, the sugar taste stimulus, and the acid taste stimulus synergistically combine to over-activate a person's phrenic nerve via a gag reflex, thereby arresting singultus.

Figure 2:
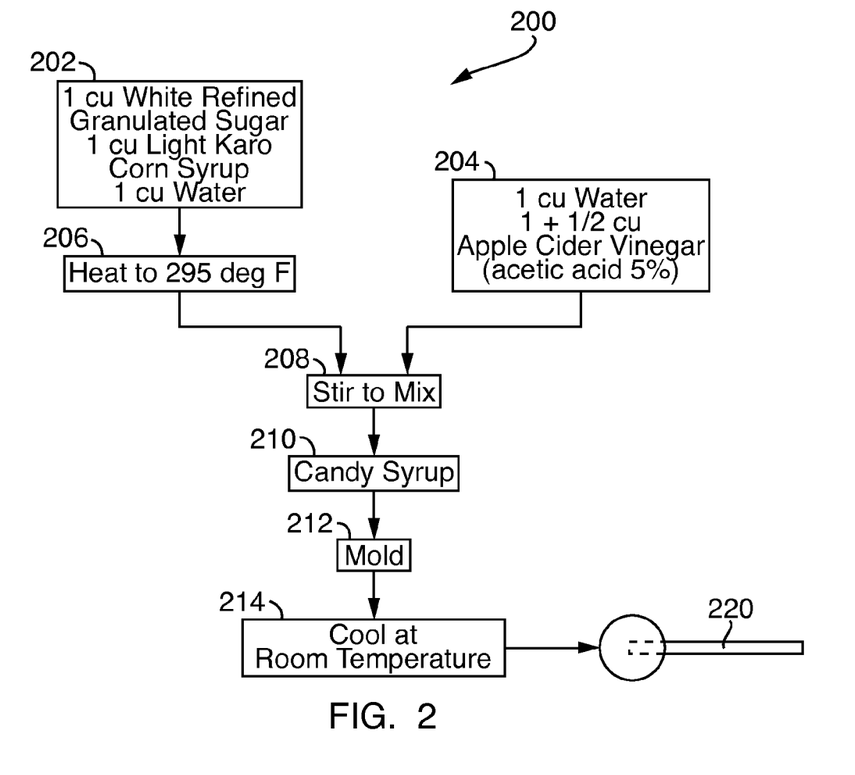
FIG. 2 shows in schematic view a recipe for preparing a candy article having a singultus-seizing shape and composition, according to a first aspect of the invention.

FIG. 2 shows a recipe 200 for forming the candy 10 according to a first aspect of the invention. The recipe ingredients include a first mixture of ingredients 202 (2 cu (400 g) organic sugar, 1 cu (340 g) light corn syrup, 1 cu (236 ml) water) as well as a second mixture of ingredients 204 (1 cu (236 ml) water and 1½ cu (354 ml) organic apple cider vinegar, acetic acid 5%). The recipe ingredients provide a proportion of about 23 sugar:1 acetic acid.

At step 206, the first mixture of ingredients 202 is heated to about 295 degrees Fahrenheit (between 290-300 deg F.), which is between the "soft crack" and "hard crack" temperature ranges known to candy makers. When stable temperature has been achieved, at step 208 the second mixture of ingredients 204, previously held at room temperature, is added with the first mixture 202 to form a candy syrup 210. At step 212, the candy syrup 210 is decanted into molds, in which sticks 12 have been pre-positioned. At step 214, the candy syrup cools in the molds at room temperature to form gooey candy lollipops 220 that hold a suckable form and taffy-like consistency for a few days.

Figure 3:
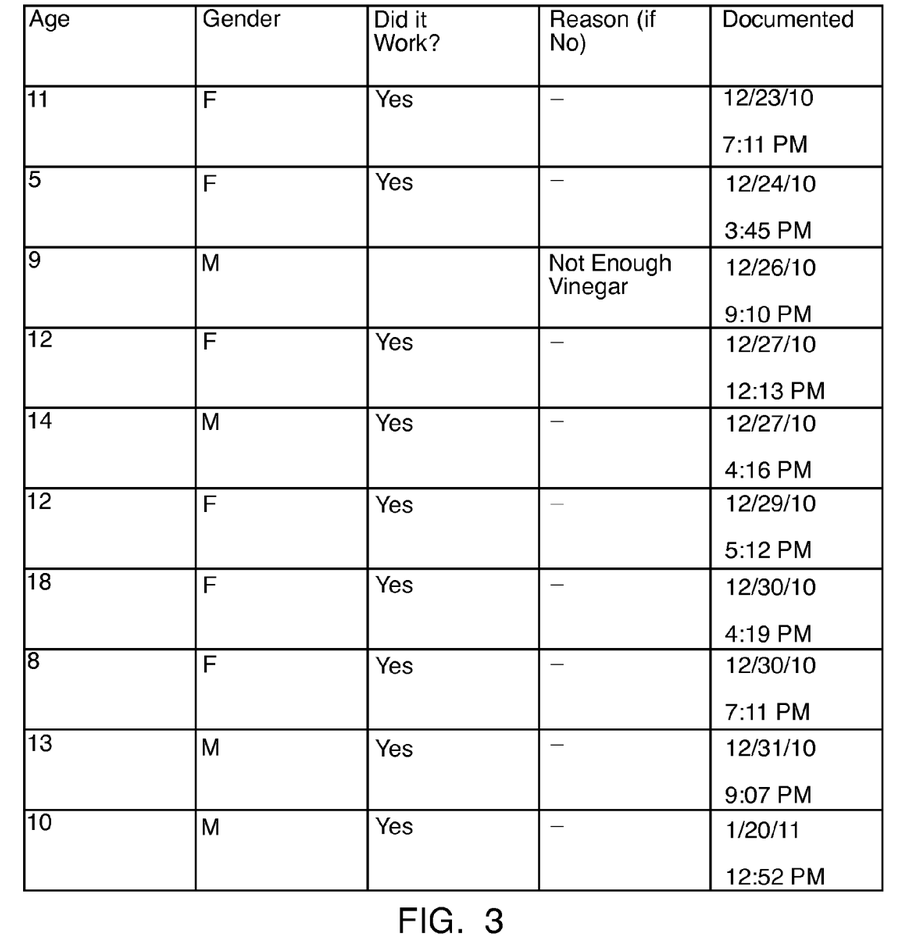
FIG. 3 shows in tabular form the results of a study on efficacy of the candy article shown in FIGS. 1 and 2.

FIG. 3 shows results from efficacy testing of lollipops 220 produced according to the recipe 200 as shown in FIG. 2. As noted by one participant, a stronger sour flavor (higher proportion of acetic acid to sugar) could have produced improved results.

FIGS. 4-8 show alternative recipes 400, 500, 600, 700, 800 attempted toward higher proportions of vinegar (acetic acid). Throughout these figures, similar numbers are used to indicate steps similar to those described with reference to FIG. 2.

Figure 4:
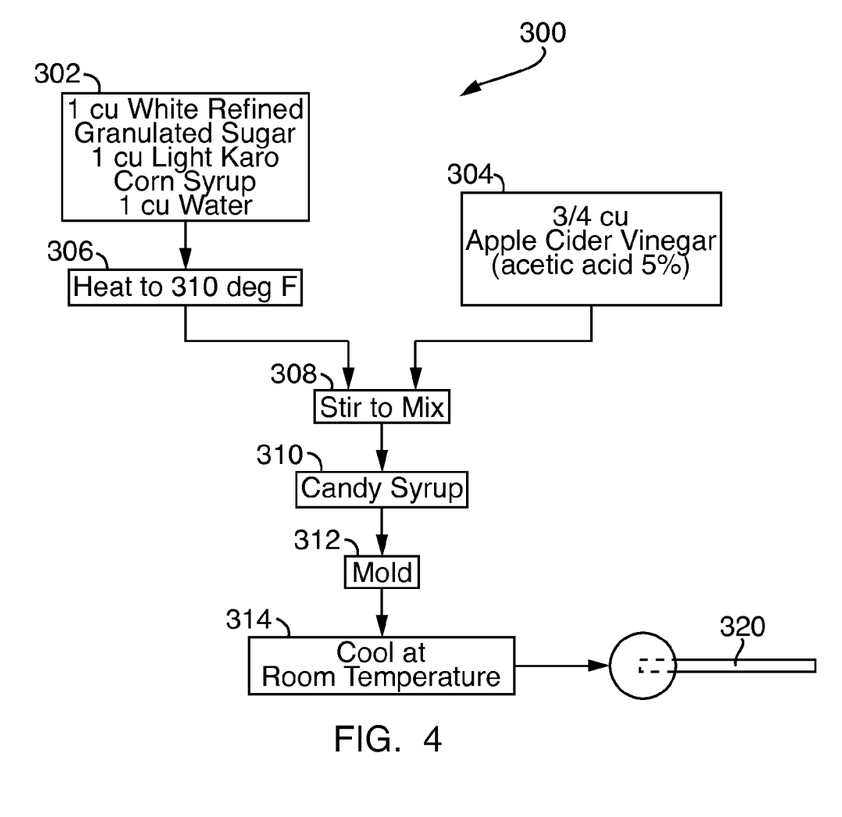
FIGS. 4-8 show in schematic view additional recipes or processes for preparing candy articles comprising singultus-seizing compositions, according to other aspects of the invention.

For example, lollipops 420 produced by the process shown in FIG. 4 were excessively sticky and stuck to teeth; were golden brown in color; extremely moisture-absorbant (hygroscopic); and extremely malleable, to the extent of being taffy-like. Notably, this was the result even though, at step 406, a first mixture 402 was heated to about 310 deg F., which is the top end of the "hard crack" temperature range as known by candy makers. It is believed this was due to the higher proportion of vinegar (acetic acid), diluting the candy syrup to a non-hardenable consistency, while also raising the hard crack temperature range of the mixture.

Figure 5:
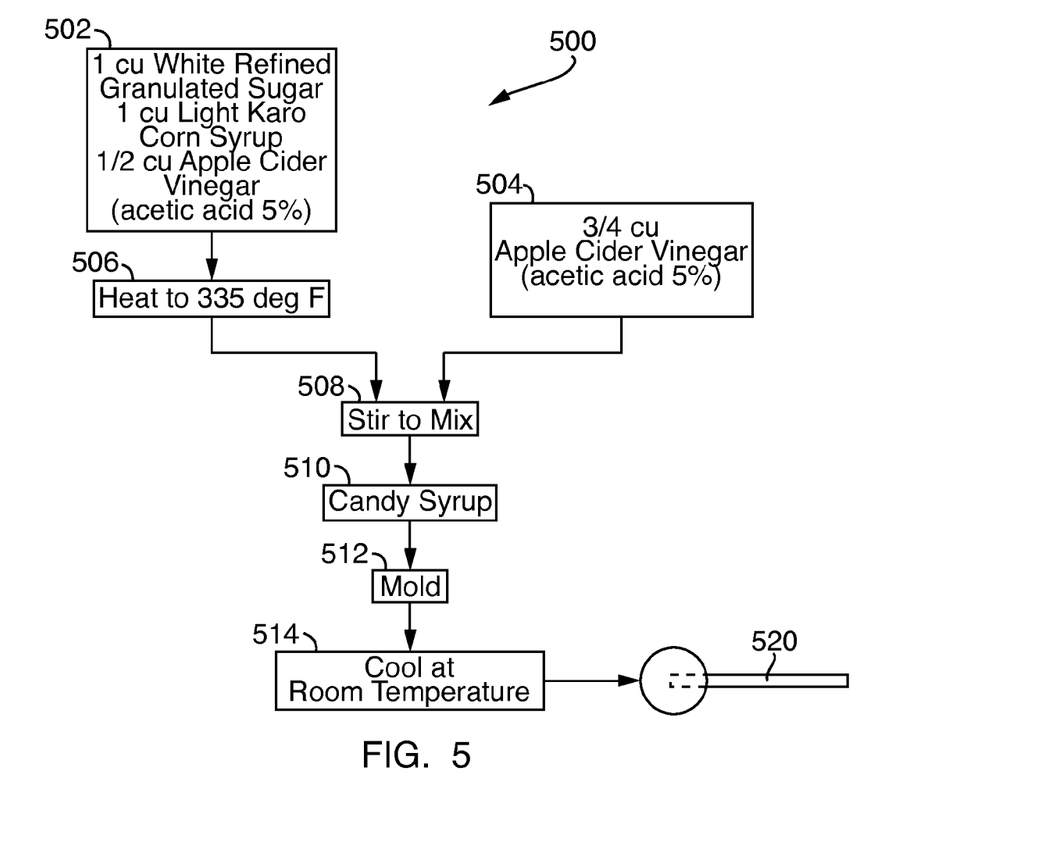

Accordingly, as shown in FIG. 5, it was attempted in a recipe 500 to heat a first mixture 502 at step 506 to a higher temperature than the conventional hard crack temperature. Those lollipops 520 produced by the recipe 500 were blackened and burnt; rock solid; completely non-hygroscopic; and disgusting in flavor. This is believed to be because, at step 506, the first mixture 502 was heated to about 335 deg F., which is beyond the caramelization temperature range as known by candy makers.

Figure 6:
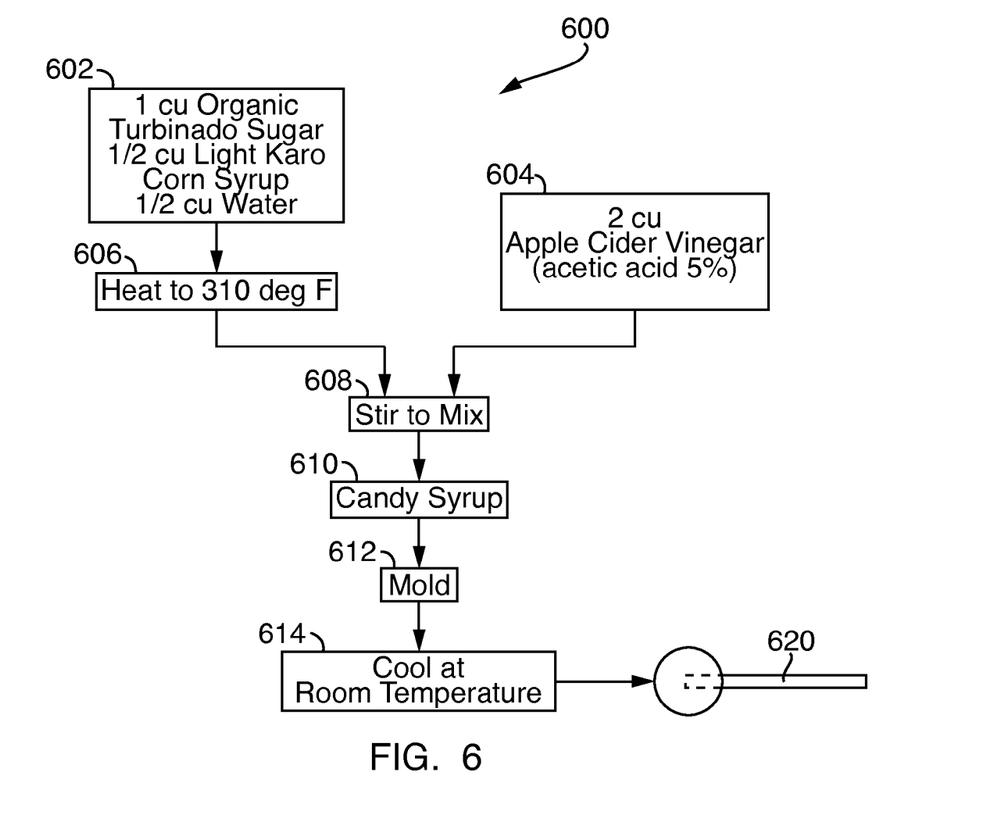

Lollipops 620, made according to recipe 600 as shown in FIG. 6, were thick and sticky; slightly hard (firm but droopy); dark brown; and tasted predominantly of apple cider vinegar. By comparison to recipe 600 as shown in FIG. 4, a reduced proportion of corn syrup in a first mixture 602, in combination with a yet-higher proportion of vinegar in a second mixture 604, further detracted from hardenability of a candy syrup 610.

Figure 7:
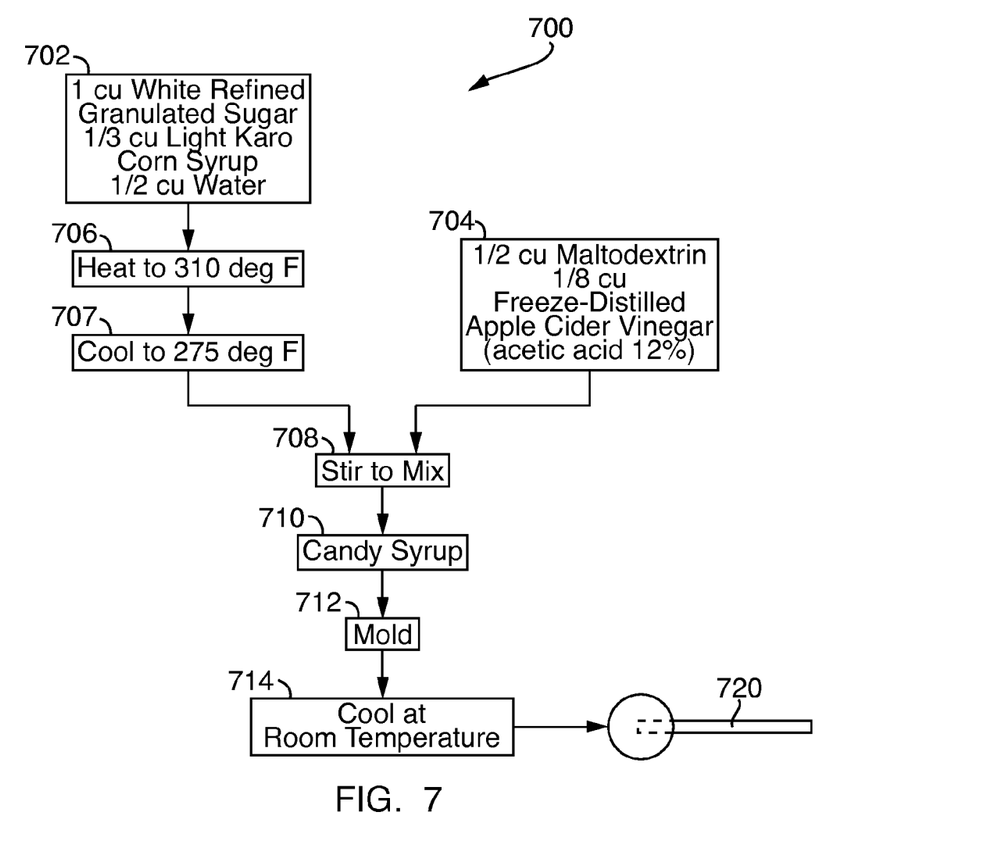
Figure 8:
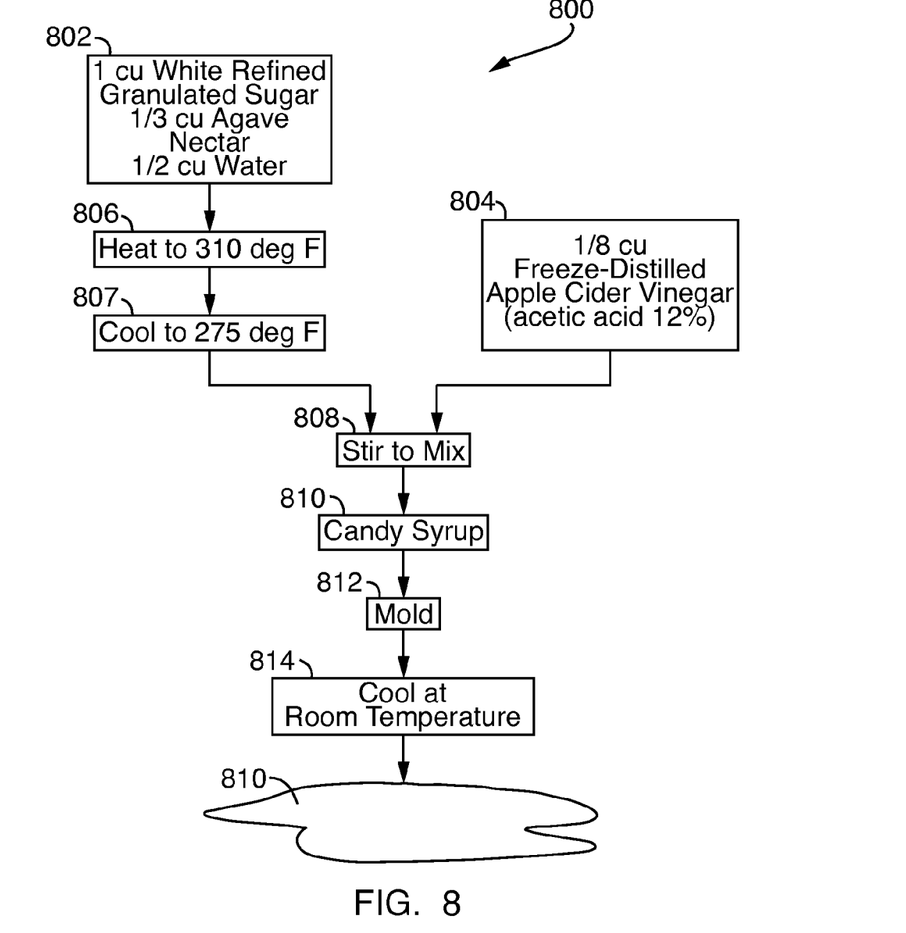

Recipes 700 and 800, shown in FIGS. 7 and 8, include additional steps 707 or 807 of cooling first mixtures 702 or 802 from about 310 deg F. (top end of "hard crack" temperature range) to about 275 deg F. (middle of "soft crack" temperature range), prior to steps 708 or 808 of mixing together first and second mixtures 702, 704 or 802, 804. Steps 707 or 807 are accomplished preferably by transferring a container holding the first mixture of ingredients 702 or 802 from a large heat source to a large heat sink such as pan of cold water. Here "large" refers to the heat capacity or power output of the heat source/heat sink, relative to the heat capacity of the mixture being heated or cooled. "Cold" indicates less than room temperature, preferably about the temperature of ground water (about 54 deg F. or between 50-55 deg F.).

The process 700 shown by FIG. 7 produced a very thick candy syrup 710 that required vigorous stirring to maintain pourability. Resultant lollipops 720 were sticky and flexible or droopy; moisture absorption was rapid so that the pops had a very short shelf life (less than about two weeks). It is believed that the maltodextrin in the second mixture 704 significantly interfered with crystallization of the candy syrup 710.

The recipe 800 shown by FIG. 8 produced a very thin syrup 810 that would not harden at room temperature to form a lollipop. Notably, a relatively low boiling point of the agave nectar introduced significant processing problems at step 806 (boiling over).

While it is considered highly desirable to delay crystallization during cooling, so that the lollipop shape can be molded, it is not desirable to prevent crystallization once the candy syrup has cooled to room temperature. Instead, it is desirable that the candy syrup should crystallize to a substantially "hard" (i.e., not chewable or malleable) and "smooth" (i.e., not sticky) condition.

Based on the above experimentation, it was theorized that a proportion of acetic acid added to the sugar/corn syrup mixture affected when and whether a durable hard candy could be formed. For example, previous candy formulas were known to include only up to as much as one teaspoon vinegar (acetic acid 5%) in combination with one or more cups of sugar. By contrast, the proposed recipes, according to embodiments of the present invention, introduce significantly greater amounts and proportions of vinegar. It was believed that such high concentrations of vinegar substantially prevented hardening of the molded candies. It also was theorized that larger quantities of water diluted the sugar/corn syrup mixture, further preventing crystallization. Thus, a longer hold time at high temperature (e.g. above boiling point of water) could be effective to enhance crystallization on cooling.

After further experimentation, it was discovered that additional steps and ingredients could be helpful in achieving a hardened and shelf-stable candy composition that incorporated large proportions of acetic acid (vinegar) for a desirably sour flavor.

Figure 9:
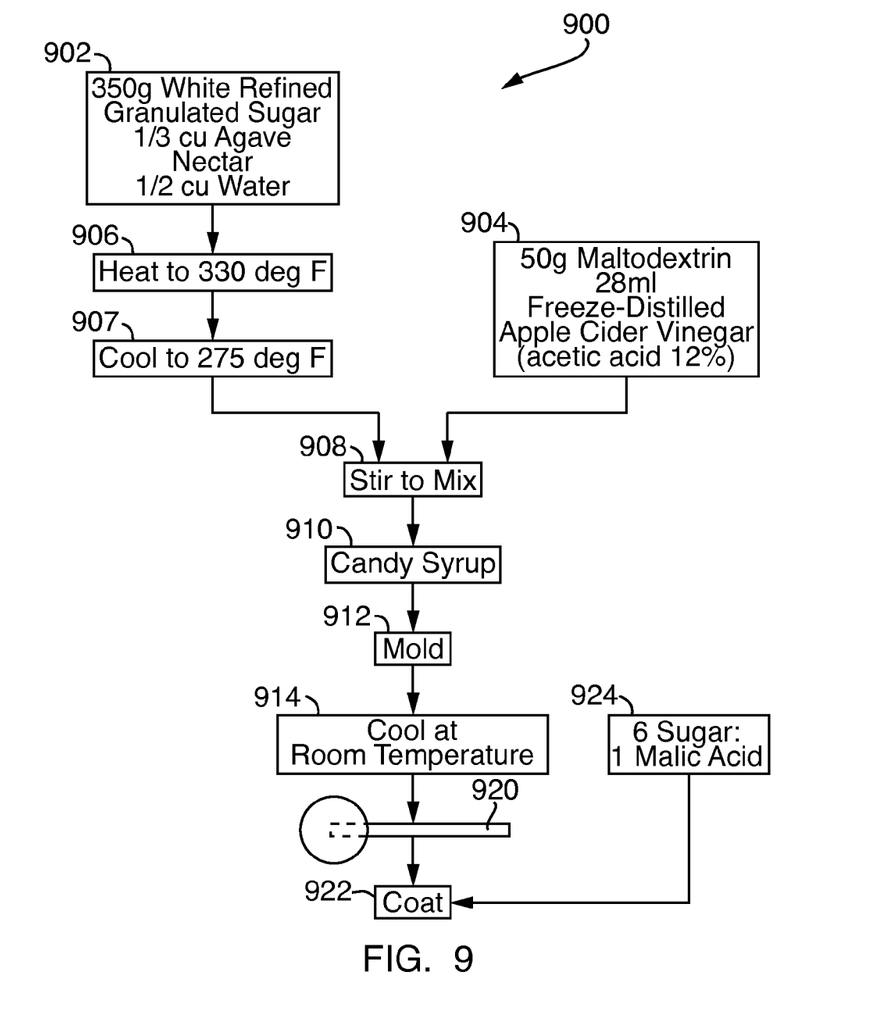
FIG. 9 shows in schematic view a recipe for preparing a shelf-stable hardened candy article having singultus-seizing shape and composition.

In consideration of the above discovery, FIG. 9 shows a recipe 900 for providing a shelf-stable candy article 920 having a singultus-seizing shape and composition. "Shelf-stable" herein means sufficiently non-hygroscopic, so as to substantially maintain its as-manufactured condition for a period of at least six months; or, preferably, at least one year; or, more preferably, at least two years.

Of note, the recipe of FIG. 9 includes a first mixture of ingredients 902 that include sugar, water, and isomalt, which results in raising the "hard crack" temperature of the first mixture. While exemplary proportions are shown in FIG. 9, satisfactory proportions can be within the following ranges: sugar 300 g to 400 g; isomalt 100 g to 200 g; water 100 ml to 200 ml.

At step 906 the first mixture 902 is formed while heating into its hard crack temperature range of about 330 deg F. (or between about 320 deg F. to 335 deg F.). During mixing, the first mixture 902 should have a wet sand consistency, dissolving to a syrupy liquid when approaching the hard crack temperature range.

The recipe 900 further includes a step 903 of freeze-distilling apple cider vinegar to achieve relatively high (10% to 18% acidity), prior to forming a second mixture of ingredients 904 that includes maltodextrin as well as the freeze-concentrated vinegar. While exemplary proportions are shown in FIG. 9, satisfactory proportions can be within the following ranges: 45 g to 75 g pure maltodextrin powder; 22 ml to 32 ml apple cider vinegar, 10% to 18% acidity. The second mixture 904 should have a pasty consistency. After step 907 of rapidly cooling the first mixture 902 from hard crack temperature to about 275 deg F. (or between about 270 deg F. to 285 deg F.), at step 908 the second mixture 904 is added to thicken the first mixture, to delay hardening of the first mixture, and to incorporate a desirably sour flavor for stimulating a user's phrenic nerve.

A moldable composition 910 results, which, at step 912, is shaped by any of various known modes into plural lozenges mounted on sticks (lollipops). For example, the composition 910 may be molded, dropped, balled, extruded, or otherwise formed. The composition 910 incorporates desirable proportions of sugar:acetic acid as follows: preferably, within a range of between 180 sugar:1 acetic acid and 80 sugar:1 acetic acid; more preferably, within a range of between 150 sugar:1 acetic acid and 90 sugar:1 acetic acid; more preferably, about 100 sugar:1 acetic acid.

After step 914 of cooling the lozenge to room temperature, a plurality of hardened and shelf-stable candy articles 920 are provided. Here "hardened" means, not chewable, malleable, or gummy when wetted within a user's mouth. Typically, between about 50 to 60 lollipops are formed, each having between about 5 and 8 g sugar and between about 0.036 g and about 0.064 g acetic acid. Thus, each candy article 920 includes sufficient flavorings of sugar and of acid for effecting singultus-seizing flavor stimulation of the phrenic nerve. However, optionally, step 922 may include coating the candy article 920 with a powder mixture 924 that includes anywhere from 3 parts to 9 parts sugar:1 part malic acid. This coating enhances the desirably sour flavor of the lollipop, which flavor as discussed above is helpful toward mitigating hiccups.

What is claimed is:

1. A singultus-arresting candy composition, formed by a process including:
    forming a first mixture of granulated sugar, isomalt, and water;
    heating the first mixture to a hard crack temperature;
    cooling the first mixture to an intermediate temperature that is a soft crack temperature of the first mixture;
    forming a syrup by mixing with the first mixture a second mixture including acetic acid and maltodextrin, such that the intermediate temperature of the first mixture is a hard crack temperature of the syrup; and
    cooling the syrup to room temperature.

2. A candy composition as claimed in claim 1, wherein the second mixture includes between 2 and 6 parts acetic acid and between 45 to 75 parts maltodextrin.

3. A candy composition as claimed in claim 1, wherein the first mixture includes between 3 and 4 parts sugar to between 1 and 2 parts isomalt.

4. A candy composition as claimed in claim 1, wherein the first mixture has a hard crack temperature range between about 320° F. and about 335° F.

5. A candy composition as claimed in claim 4, wherein the first mixture has a soft crack temperature range between about 270° F. and about 285° F.

6. A candy composition as claimed in claim 5, wherein the proportions of sugar, isomalt, acetic acid, and maltodextrin are chosen such that the syrup has a hard crack temperature range between about 270° F. and about 285° F.

7. A candy composition as claimed in claim 1, wherein the syrup includes between about 2 and 6 parts acetic acid, between about 45 and 75 parts maltodextrin, between about 300 and 400 parts sugar, and between about 100 and 200 parts isomalt.

8. A singultus-arresting candy article, comprising a lozenge flavored with effective amounts of sugar and acid and a stick attached to the lozenge for positioning the lozenge to stimulate a user's phrenic nerve by sucking and by flavoring, and wherein said lozenge is formed by a process including:
    forming a first mixture of granulated sugar, isomalt, and water;
    heating the first mixture to a hard crack temperature;
    cooling the first mixture to an intermediate temperature that is a soft crack temperature of the first mixture;
    forming a syrup by mixing with the first mixture a second mixture including acetic acid and maltodextrin, such that the intermediate temperature of the first mixture is a hard crack temperature of the syrup; and
    cooling the syrup to room temperature, thereby forming the lozenge.

9. A candy article as claimed in claim 8, wherein the lozenge includes more than about 80 parts sugar to 1 part acetic acid and less than about 180 parts sugar to 1 part acetic acid.

10. A candy article as in claim 8, wherein the lozenge includes more than about 90 parts sugar to 1 part acetic acid and less than about 150 parts sugar to 1 part acetic acid.

11. A candy article as in claim 8, wherein the lozenge includes about 100 parts sugar to about 1 part acetic acid.

12. A candy article as in claim 8, wherein the lozenge is coated with a powder mixture of sugar and malic acid.

13. A candy article as claimed in claim 12, wherein the powder mixture includes between more than 3 parts sugar to 1 part malic acid and less than 9 parts sugar to about 1 part malic acid.

\* \* \* \* \*